United States Patent [19]
Dell'Acqua

[11] Patent Number: 4,946,305
[45] Date of Patent: Aug. 7, 1990

[54] COUPLING FOR TRANSMITTING ROTARY MOTION BETWEEN A PAIR OF SHAFTS, EVEN WHEN SAID SHAFTS ARE OFF-CENTERED

[75] Inventor: Silvano Dell'Acqua, Varese, Italy

[73] Assignee: Nuova Sircop Engineering S.r.l., Italy

[21] Appl. No.: 328,249

[22] Filed: Mar. 24, 1989

[30] Foreign Application Priority Data

Sep. 22, 1988 [IT] Italy .................. 21903/88[U]

[51] Int. Cl.$^5$ .................. F16L 23/00; F16B 3/00
[52] U.S. Cl. .................. 403/336; 403/337; 403/356; 403/109; 285/368
[58] Field of Search .............. 403/336, 337, 338, 109, 403/335, 356, 365, 366; 285/368, 412, 330

[56] References Cited

U.S. PATENT DOCUMENTS 2,181,537 4/1939 Schmitter .................. 403/335

FOREIGN PATENT DOCUMENTS 447143 3/1948 Canada .................. 287/130
49058 7/1919 Sweden .................. 403/336

Primary Examiner—Randolph A. Reese
Assistant Examiner—Carol I. Bordas
Attorney, Agent, or Firm—Notaro & Michalos

[57] ABSTRACT

A coupling for joining together pairs of shafts set on the same line but not co-axial, comprising a pair of hubs keyed onto the shafts and interconnected by an outer bell-like device and providing, as joining elements between the couplings and the bell, a plurality of rounded rollers.

2 Claims, 1 Drawing Sheet

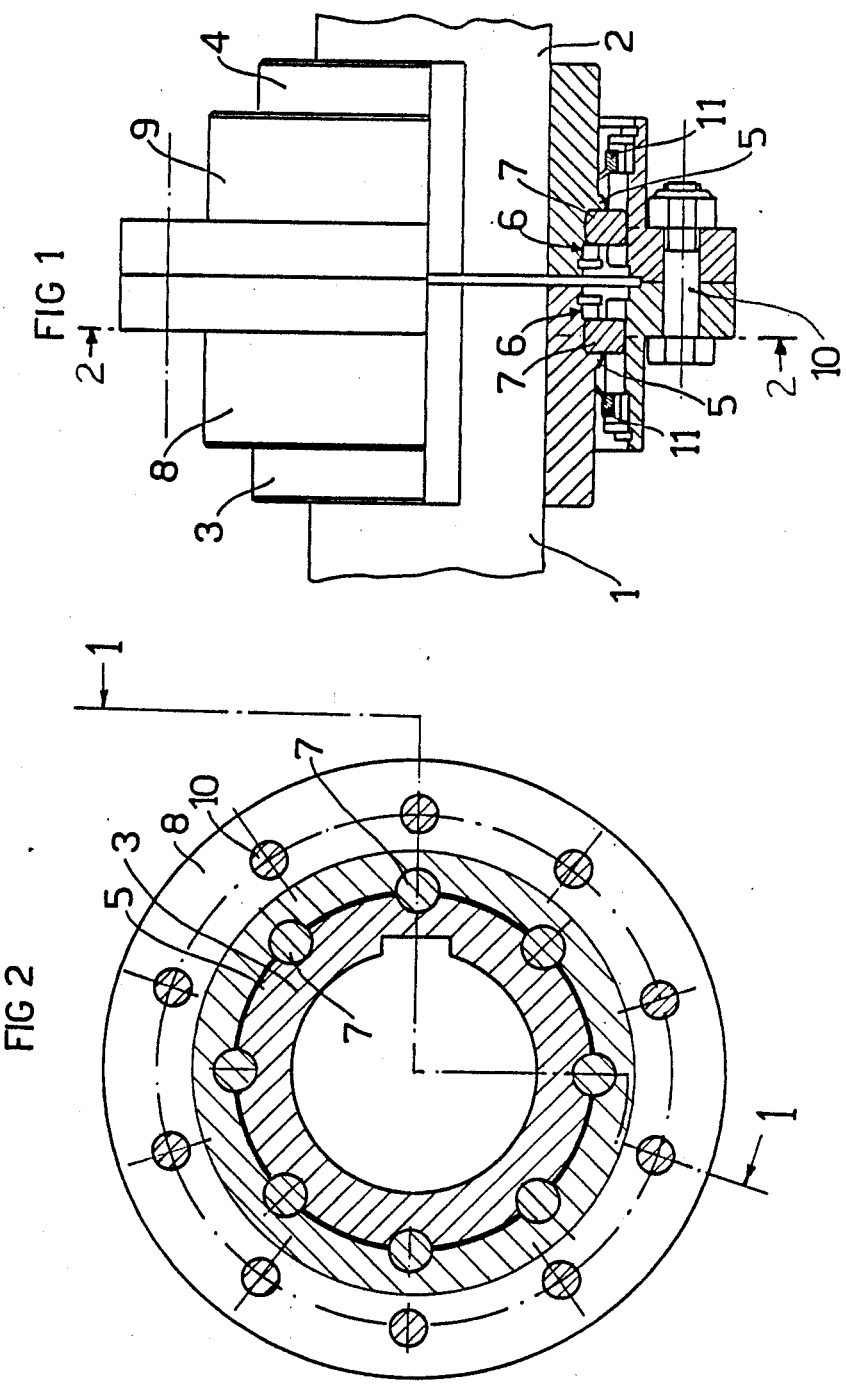

COUPLING FOR TRANSMITTING ROTARY MOTION BETWEEN A PAIR OF SHAFTS, EVEN WHEN SAID SHAFTS ARE OFF-CENTERED

FIELD AND BACKGROUND OF THE INVENTION

The present invention provides a coupling for joining a pair of shafts disposed head to head, said coupling being shaped as to work without any inconvenience even in the case that the shafts linked thereto are somewhat off-centered.

The coupling according to the invention, moreover, consists of fewer components, is easier to assemble and requires reduced maintenance, than known devices.

There are known different types of coupling for linking a pair of shafts arranged head-to-head, even if they are slightly off-centered.

For instance, rubber pin couplings are known, consisting substantially of a pair of flanges with a hub keyed at the shaft ends, on which are cantilever-mounted a series of alternate pins covered with tubular rubber elements, engaging with corresponding holes made in the flanges.

This kind of coupling, however, enables just a limited off-centering of the shafts, and is prone to wear owing to the deterioration in time of the rubber covering of the pins.

Other couplings, for instance those of the Falk type, comprise a pair of disks with hubs keyed on the shaft ends, said disks being provided with a plurality of protruding elements linked to one another by a flexible metal belt, enabling limited reciprocal shifting of the two parts of which the coupling consists.

This embodiment too allows only limited off-centering, and is very expensive, owing to its complex structure.

There are known also claw couplings wherein the hubs fixed to the two shafts are provided with peripheral teeth that engage with corresponding inner teeth of a bell-like device that joins the two hubs together. These teeth may have a rounded outline, so as to allow the shafts to be slightly off-centered, up to about 2°–3° at the most.

This kind of coupling too, however, is not free of drawbacks, both because the making of teeth with a rounded profile is a rather costly process and because the friction among the coupling parts makes the coupling itself wear out and reduces the life-time thereof.

SUMMARY OF THE INVENTION

With a view toward obviating the foregoing drawbacks, the present invention provides a coupling wherein motion is transmitted by a series of rounded rollers.

This enables the two semi-shafts, once the coupling has been mounted, to be off-centered with respect to each other about twice as much as the analogous known couplings, but without the inconveniences shown by the latter in terms of wear and high costs.

BRIEF DESCRIPTION OF THE DRAWINGS

The present invention will now be described in detail, by mere way of example, with reference to the accompanying drawings in which:

FIG. 1 is a partially sectioned view of a coupling according to the invention and taken on line 1—1 of FIG. 2; and FIG. 2 is a view of the coupling along line 2—2 of FIG. 1, in a direction orthogonal to that of FIG. 1.

DESCRIPTION OF THE PREFERRED EMBODIMENT

The coupling according to the invention is a mechanism by which a pair of semi-shafts 1 and 2 set on the same line but not necessarily co-axial, are coupled. Two hubs 3, 4 are connected by keys or other known systems to the end of each shaft 1 and 2. In the proximity to the facing zones of each hub are provided, an annular rim 5 in which are made a plurality of axial slots 6 which house as many barrel-shaped or rounded rollers 7, functioning as motion transmission elements.

Onto hubs 3, 4 are mounted respective semi-bells 8, 9 having the same number of inner axial slots as that of the hubs, serving too as housings for the rounded rollers.

The semi-bells are interconnected by means of bolts 10 or other analogous system, while a pair of cage gaskets 11 are inserted between hubs and bells as packing elements for lubricant.

The annular rims 5 have rounded outer profiles, so as to allow the hubs 3 and 4 to be set somewhat at an angle with respect to the bells.

Of course the number and size of both the rounded rollers 7 and the bolts 10 is deterrmined as a function of the torque to be transmitted.

Thanks to the use of the rounded rollers it is possible, in case the two semi-shafts are off-centered with respect to each other, to obtain a rolling motion between the contacting surfaces their rollers and of the respective seats, in contrast to what happens in the known devices, namely the sliding of the contacting surfaces—as in the case of claw couplings—or resilient deformations with heat developing due to friction and deformation, and therefore energy dissipation and a greater wear of the components—as in the case of the rubber pin coupling and the Falk couplings.

Owing to the described characteristics, the coupling according to the invention has fewer working problems and a longer life span in comparison to the known solutions, besides allowing the shafts to be more off-centered with respect to one another.

Of course the sizes, as well as the employed materials, may vary as a function of the different requirements of use.

I claim:

1. A coupling for connecting the ends of a pair of shafts, comprising:
   a hub non-rotatably connected to the end of each shaft, each hub facing the other hub at a facing end thereof, each hub having an outer surface with a plurality of circumferentially spaced axially extending slots distributed therein;
   a bell engaged over the slots and facing ends of the hubs and including an inner surface with a plurality of circumferentially spaced, axially extending slots corresponding in number and positioned to respective slots of said hubs to form a plurality of roller housings between said hubs and said bell, said bell comprising a pair of semi-bells connected to each other;
   a barrel-shaped rounded roller rotatably mounted in each housing for co-rotation of said hubs and the shaft ends, and for allowing some non-coaxial orientation between the shaft ends;

an annular rim having a rounded outer surface connected to each hub adjacent the axial slot of each hub and engageable with the inner surface of said bell for permitting non-coaxial orientation between the shatf ends; and a pair of cage gaskets engaged between said bell and each respective hub for sealing a space containing said housings.

2. A coupling according to claim 1 including key means connected between each hub and each respective shaft end for non-rotatably connected each hub to a respective shaft end.

* * * * *